United States Patent
Happel et al.

(10) Patent No.: US 8,839,564 B2
(45) Date of Patent: Sep. 23, 2014

(54) TRAILER DOOR SEAL

(75) Inventors: Andrew J. Happel, Fort Wayne, IN (US); Myron S. Worley, Middlebury, IN (US); Katherine A. Bergfeld, Waterville, OH (US)

(73) Assignee: Press-Seal Gasket Corporation, Fort Wayne, IN (US)

( * ) Notice: Subject to any disclaimer, the term of this patent is extended or adjusted under 35 U.S.C. 154(b) by 0 days.

(21) Appl. No.: 13/193,268

(22) Filed: Jul. 28, 2011

(65) Prior Publication Data

US 2012/0023829 A1 Feb. 2, 2012

Related U.S. Application Data

(60) Provisional application No. 61/368,353, filed on Jul. 28, 2010, provisional application No. 61/430,356, filed on Jan. 6, 2011.

(51) Int. Cl.
*E06B 7/22* (2006.01)

(52) U.S. Cl.
USPC ........... 49/495.1; 49/368; 49/490.1; 49/498.1

(58) Field of Classification Search
USPC ........... 49/475.1, 479.1, 484.1, 490.1, 495.1, 49/498.1, 366, 367, 368, 369, 483.1
See application file for complete search history.

(56) References Cited

U.S. PATENT DOCUMENTS

| | | | | |
|---|---|---|---|---|
| 2,575,793 | A * | 11/1951 | Bush | 72/338 |
| 2,811,406 | A | 10/1957 | Moore et al. | |
| 2,912,727 | A * | 11/1959 | Sehn | 49/371 |
| 3,161,925 | A * | 12/1964 | Bertolini | 49/368 |
| 3,518,792 | A | 7/1970 | Williamson et al. | |
| 3,717,955 | A | 2/1973 | Urbanick | |
| 3,784,243 | A * | 1/1974 | Pastva, Jr. | 292/300 |
| D233,033 | S | 10/1974 | Donne | |
| 3,886,686 | A | 6/1975 | Urbanick | |
| 4,001,974 | A * | 1/1977 | Wright | 49/489.1 |
| 4,010,573 | A * | 3/1977 | Andrzejewski | 49/479.1 |
| 4,015,368 | A * | 4/1977 | Court et al. | 49/489.1 |
| 4,085,966 | A * | 4/1978 | Ringe | 296/146.5 |
| 4,119,325 | A * | 10/1978 | Oakley et al. | 277/642 |

(Continued)

FOREIGN PATENT DOCUMENTS

| | | |
|---|---|---|
| DE | 103 10 101 | 9/2004 |
| EP | 0 178 064 | 4/1986 |

OTHER PUBLICATIONS

International Search Report and Written Opinion dated Dec. 23, 2011 in corresponding International Application No. PCT/US2011/045757.

*Primary Examiner* — Katherine Mitchell
*Assistant Examiner* — Justin Rephann
(74) *Attorney, Agent, or Firm* — Faegre Baker Daniels LLP

(57) ABSTRACT

A one-piece seal is used between the rear doors of a semi-trailer truck and the rear frame of the truck, the seal having a good compression set resistance. The seal is made from multiple extrusion members that are fused, welded, or otherwise integrally, monolithically connected at corner joints to form a central opening. The extrusion members have a sealing profile, or cross-section, that allows for the compression and deflection of a pair of sealing lobes to create inner and outer seals, respectively, between the trailer frame and the door structure at the rear of a semi-trailer truck, as well as between the doors themselves.

30 Claims, 11 Drawing Sheets

(56) References Cited

U.S. PATENT DOCUMENTS

| | | | |
|---|---|---|---|
| 4,288,135 A * | 9/1981 | Buchser et al. | 312/296 |
| D263,749 S | 4/1982 | Sorenson | |
| 4,447,065 A | 5/1984 | Dupuy et al. | |
| 4,527,807 A | 7/1985 | Urbanick | |
| 4,769,947 A * | 9/1988 | Ogawa et al. | 49/479.1 |
| 4,910,918 A * | 3/1990 | Naples et al. | 49/441 |
| 4,928,431 A * | 5/1990 | Kuzuhara et al. | 49/479.1 |
| 5,107,622 A * | 4/1992 | Fuchs et al. | 49/484.1 |
| 5,398,451 A * | 3/1995 | Mesnel | 49/479.1 |
| 5,423,147 A | 6/1995 | Depuy | |
| 5,493,814 A * | 2/1996 | Christian | 49/479.1 |
| 5,499,475 A | 3/1996 | Court et al. | |
| 5,511,343 A | 4/1996 | Guillon | |
| 5,538,317 A | 7/1996 | Brocke et al. | |
| 5,626,383 A | 5/1997 | Lee et al. | |
| 5,970,659 A | 10/1999 | Oord | |
| 6,021,609 A * | 2/2000 | Teishi | 49/479.1 |
| 6,117,265 A * | 9/2000 | Cittadini et al. | 156/258 |
| 6,158,171 A | 12/2000 | Kellogg et al. | |
| 6,273,433 B1 | 8/2001 | Yu | |
| 6,405,489 B1 * | 6/2002 | Miura | 49/479.1 |
| 6,478,308 B1 * | 11/2002 | McMillin et al. | 277/630 |
| 6,527,278 B1 | 3/2003 | Norris | |
| 6,598,347 B2 * | 7/2003 | Hattori | 49/479.1 |
| 6,640,499 B2 | 11/2003 | Yamashita et al. | |
| 6,725,605 B2 * | 4/2004 | Schlachter et al. | 49/479.1 |
| 6,777,068 B2 | 8/2004 | Teramoto et al. | |
| 6,802,666 B1 * | 10/2004 | Bormann et al. | 403/233 |
| 6,996,936 B1 * | 2/2006 | Maass | 49/479.1 |
| 7,306,839 B2 * | 12/2007 | Kubo et al. | 428/122 |
| 8,157,270 B2 * | 4/2012 | Tsou et al. | 277/644 |
| 8,272,178 B2 * | 9/2012 | Pardue et al. | 52/202 |
| 2001/0008058 A1 * | 7/2001 | Kawai et al. | 49/479.1 |
| 2001/0034977 A1 * | 11/2001 | Hattori | 49/479.1 |
| 2002/0026751 A1 * | 3/2002 | Kawai et al. | 49/479.1 |
| 2002/0139054 A1 * | 10/2002 | Schlachter et al. | 49/479.1 |
| 2004/0250474 A1 * | 12/2004 | Kubo et al. | 49/479.1 |
| 2005/0193636 A1 | 9/2005 | Jyawook et al. | |
| 2007/0245635 A1 | 10/2007 | Deguchi et al. | |

* cited by examiner

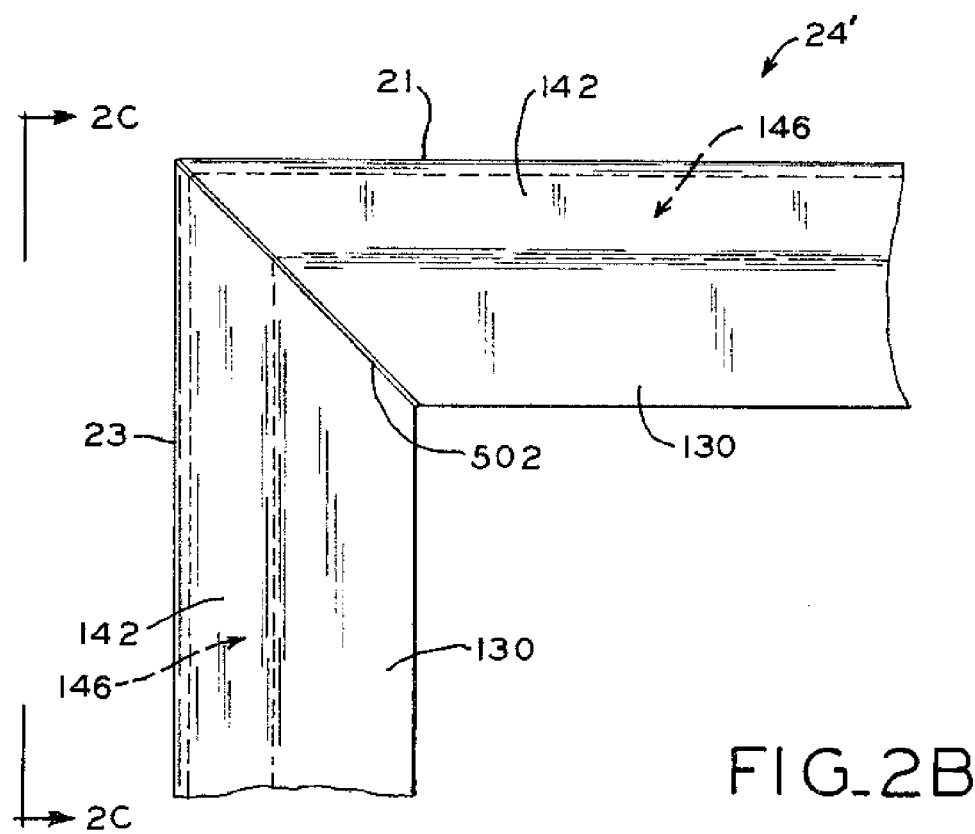
FIG_2B
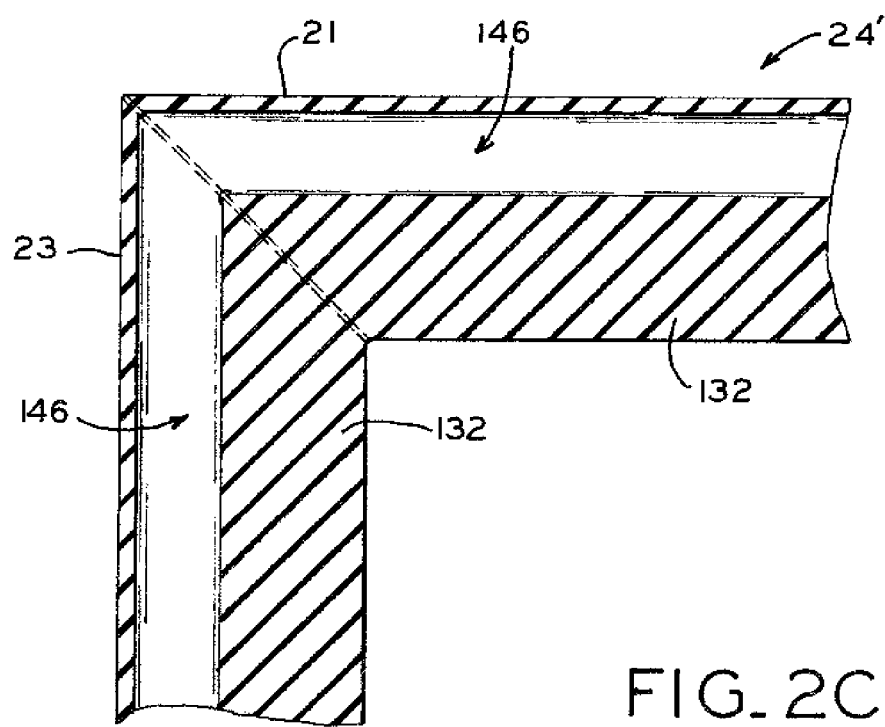
FIG_2C

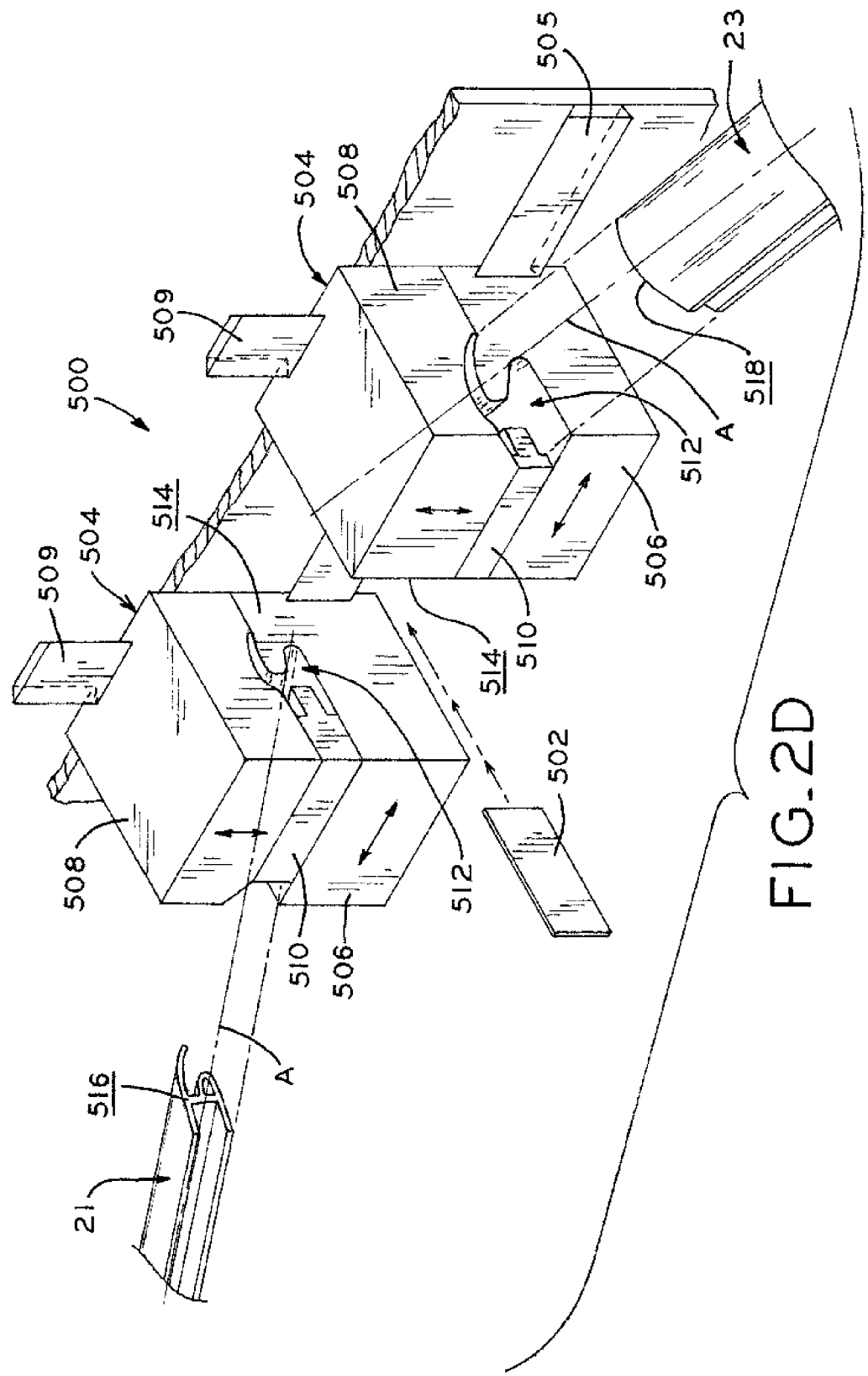
FIG._2D

FIG_6

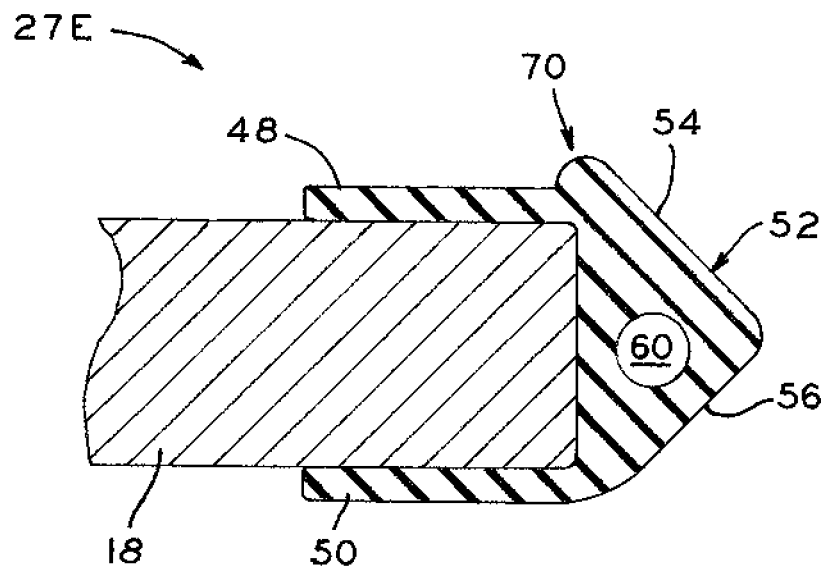
FIG_15
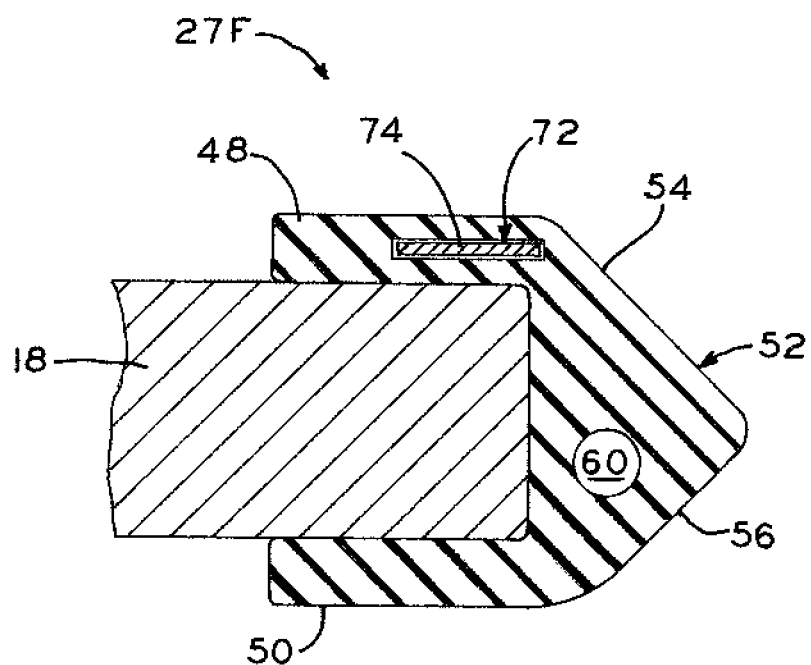
FIG_16

TRAILER DOOR SEAL

CROSS-REFERENCE TO RELATED APPLICATIONS

This application claims the benefit under Title 35, U.S.C. §119(e) of U.S. Provisional Patent Application Ser. No. 61/368,353, filed on Jul. 28, 2010 and entitled TRAILER DOOR SEAL, and U.S. Provisional Patent Application Ser. No. 61/430,356, filed on Jan. 6, 2011 and entitled TRAILER DOOR SEAL, the entire disclosures of which are hereby expressly incorporated by reference herein.

BACKGROUND

1. Technical Field

The present disclosure relates to seals, and in particular, to seals that are adapted to seal doors such as semi-trailer trucks, boxcars, shipping containers, building doors, etc.

2. Description of Related Art

Known seals for use on, for example, the doors of semi-trailer trucks are made from a thermoplastic that is not able to withstand extreme hot or cold temperatures. Usually, such seals are used for only one or two seasons before seal replacement is needed. Thus, such known seals are short-term in use.

Some known seals are formed as a plurality of separate pieces that are not joined to one another. These separate members can be joined at their respective corners using separate molded corner blocks that must be sealed to the separate members via glue or silicone caulk, for example. Not only are these multi-piece seals expensive, the multi-piece seals are also difficult to install and maintain.

Further, some known thermoplastic seals rely on a flap that seals via bending against the rear frame of a trailer. However, thermoplastic has poor performance in compression set, which is the measure of the material's ability to maintain deformation force over a long period of time. Therefore, over time, the thermoplastic flap of the known seal will not maintain a sealing force against the frame of a semi-trailer truck.

Still other seals are pre-formed to fit a given truck door size. These seals normally cannot be deformed without compromising the effectiveness of the seal, and are therefore shipped as a single, door-shaped piece in a large, flat shipping container having approximately the same dimensions as the door to which the seal will be mounted.

A need exists for a new seal design that has an improved compression set performance and that may withstand extreme seasonal temperature changes to reduce the need for replacement of the seal after a short period of use.

SUMMARY

The present disclosure provides a one-piece seal for use between the rear doors of a semi-trailer truck and the rear frame of the truck, the seal having a good compression set resistance. The seal is made from multiple extrusion members that are fused, welded, or otherwise integrally, monolithically connected at corner joints to form a central opening that extends continuously around the corner joints. The extrusion members have a sealing profile, or cross-section, that allows for the compression and deflection of a pair of sealing lobes to create inner and outer seals, respectively, between the trailer frame and the door structure at the rear of a semi-trailer truck, as well as between the doors themselves.

The seal is formed from an elastomeric material that is elastically deformable, resilient, compressible and packable by rolling, stuffing or folding into a compact space. The seal material retains a constant deformation force over an extended period of time, and accommodates repeated deformations while maintaining a fluid-tight seal that seals the inside of the trailer from the outside environment. The elastic deformation and monolithic, one-piece design simplifies installation as the seal will stretch over the door and hold itself in place. Moreover, the seal is both weather resistant in sub-zero temperatures and resistant to degradation by UV exposure.

In one form thereof, the present disclosure provides a door seal for use in sealing a periphery of a door, the seal comprising: a monolithic seal made of a resilient, elastically deformable material, the seal including: a plurality of seal portions; a plurality of seal corners, each of the seal corners integrally joining two of the plurality of seal portions; and the plurality of seal portions joined by the seal corners to form a closed profile, the seal portions cooperating to define at least one sealing lobe extending continuously around a periphery of the seal.

In another form thereof, the present disclosure provides a door seal for use in sealing a gap between a periphery of a door and an opening, the door having a door edge extending between corners formed on a periphery of the door, the seal comprising: a first seal portion made of a resilient, elastically deformable material, the first seal portion having a first cross-sectional profile comprising: a first mounting portion defining a first space sized to receive a portion of the edge of the door; and a deformable, first sealing lobe extending away from the first mounting portion, the first sealing lobe adapted to create a compression seal between the edge of the door and the opening; a second seal portion made of a resilient, elastically deformable material, the second seal portion having a second cross-sectional profile comprising: a second mounting portion defining a second space sized to receive a portion of the edge of the door; and a deformable, second sealing lobe extending away from the second mounting portion, the second sealing lobe adapted to create a compression seal between the edge of the door and the opening, the second seal portion fused to the first seal portion at an angle relative to the first seal portion, the first sealing lobe joined to the second sealing lobe to form a continuous lobe corner extending around a corner of the door, the continuous lobe corner dimensioned to provide a compression seal between the corner of the door and an adjacent corner of the opening.

In yet another form thereof, the present disclosure provides a method of producing a door seal, the method comprising: procuring a first seal portion holder, the first seal portion holder comprising: a first recess defining a longitudinal axis, and a first inner face defining an angle with respect to the longitudinal axis of the first recess; procuring a second seal portion holder, the second seal portion holder comprising: a second recess defining a longitudinal axis, and a second inner face defining a second angle with respect to the longitudinal axis of the second recess; placing a first seal portion into the first seal portion holder, the first seal portion having a miter-cut end, the step of placing the first seal portion including placing the miter-cut end substantially flush with the first inner face; placing a second seal portion into the second seal portion holder, the second seal portion having a miter-cut end, the step of placing the second seal portion including placing the miter-cut end substantially flush with the second inner face; and fusing the first seal portion to the second seal portion.

In still another form thereof, the present disclosure provides a method of sealing an opening, the method comprising: procuring a monolithic, elastically deformable first seal, the first seal comprising: a first plurality of seal portions; a first plurality of seal corners, each of the seal corners integrally joining two of the first plurality of seal portions; and the first plurality of seal portions joined by the seal corners to form a closed profile, the first plurality of seal portions cooperating to define at least one sealing lobe extending continuously around a periphery of the first seal; attaching a first one of the first plurality of seal corners to a corresponding first corner of a first door, the first door movable between a closed position and an open position; stretching one of the first plurality of seal portions to align a second one of the first plurality of seal corners with a corresponding second corner of the first door; attaching the second one of the first plurality of seal corners to the corresponding second corner of the first door; and repeating the attaching and stretching steps for the remainder of the first plurality of seal corners such that the first seal fully encapsulates a periphery of the first door.

BRIEF DESCRIPTION OF THE DRAWINGS

The above-mentioned and other features and advantages of this disclosure, and the manner of attaining them, will become more apparent and the invention itself will be better understood by reference to the following descriptions of an embodiment of the invention taken in conjunction with the accompanying drawings, wherein:

FIG. 2B is a fragmentary view of a right-door seal according to the present disclosure, illustrating an inside-facing portion of the seal corner prior to a fusing process;

FIG. 2C is a section view of the right-door seal shown in FIG. 2B, in which the section line bisects a hollow formed in a seal lobe;

FIG. 2D is a perspective view of a fusing apparatus operable to fuse mitered seal corners;

FIG. 15 is a cross-sectional view of an outer door seal mounted on the vertical edge of a first closing door in accordance with an additional embodiment of the present disclosure; and FIG. 16 is a cross-sectional view of an outer door seal mounted on the vertical edge of a first closing door in accordance with a still further embodiment of the present disclosure.

Corresponding reference characters indicate corresponding parts throughout the several views. The exemplifications set out herein illustrate an exemplary embodiment of the invention, and such exemplifications are not to be construed as limiting the scope of the disclosure in any manner.

DETAILED DESCRIPTION

Large trucks, such as semi-trailer trucks, often need sealing units between rear door structures and a rear frame of the truck, as well as between the rear doors themselves. The present one-piece seal designed for installation on trailer doors for semi-trailer trucks is made of four individually extruded sections, or extrusion members. The extrusion members are heat fused or welded together to form a four-sided, one-piece, monolithic design having a closed profile. This one-piece design ensures that there is no leak path across the seal when the seal is placed on the semi-trailer truck.

While the seals of the present disclosure are discussed in terms of semi-trailer truck doors, other uses are also contemplated. For example, shipping containers, railroad boxcars and building doors may be used with seals made in accordance with the present disclosure. Moreover, any aperture or opening which is sealingly blocked with a cover of comparable size and shape may benefit from the application of such seals.

Figure 1:
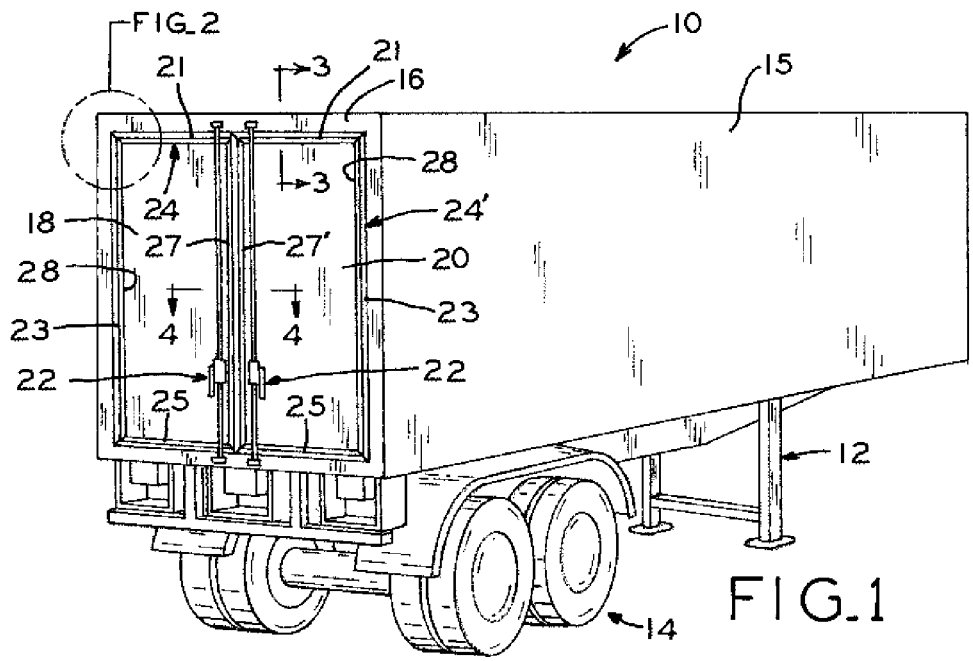
FIG. 1 is a rear perspective view of a semi-trailer truck including doors that are fitted with seals according to the present disclosure.

Referring now to FIG. 1, trailer 10 of a semi-trailer truck is shown as having leg prop assembly 12, wheel assembly 14, and cargo box 15. Cargo box 15 has five sides sealed to one another to define a cargo space therein, with the sixth side of cargo box 15 open for transferring cargo to and from the cargo space. The open sixth side is selectively closed by a rear door assembly including a generally rectangular rear frame 16, doors 18 and 20, latch assemblies 22, and seals 24, 24'. As discussed in detail below, seals 24, 24' span the gaps between rear frame 16 and doors 18, 20, as well as the gap between left door 18 and right door 20.

1. Seal Configurations and Characteristics

Referring still to FIG. 1, left seal 24 mounts to left door 18, and right seal 24' mounts to right door 20. Left and right seals 24, 24' are generally similar in structure, except where left and right seals 24, 24' interact with one another to seal the gap between left and right doors 18, 20 (described below and shown, e.g., in FIGS. 8-10). More particularly, seals 24, 24' each include identical upper seal portions 21, outer seal portions 23, and lower seal portions 25, which are respectively sized and adapted to mate with the top, outside and bottom edges of doors 18, 20. Seals 24, 24' also include inner seal portions 27, 27' which may differ from one another to facilitate sealing engagement between seals 24, 24' as described in detail below.

The inner, outer, upper and lower portions of seals 24, 24' are fused to one another at the seal corners to create a one-piece, monolithic seal for each of doors 18, 20. In one example, best shown in FIGS. 2A-2C, the corner of seal 24 is formed by a fused, mitered joint between upper seal portion 21 and outer seal portion 23. For a rectangular door, the mitered joint is formed by two 45-degree miter cuts to accommodate the 90-degree angle of the door corners. The other three seal corners are similarly mitered and fused together at generally right angles, such that seal 24 defines a generally rectangular central opening 28 sized and shaped to fit tightly over left door 18. Alternatively, the corners of seals 24, 24' may be formed by an injection-molding process. Such methods are described in detail in the "Methods of Production" section below.

Figure 10:
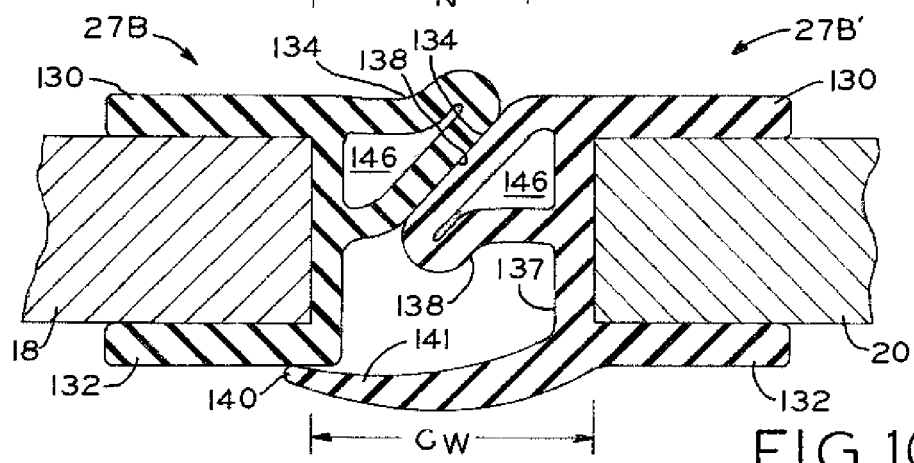
FIG. 10 is another cross-sectional view of the seal shown in FIG. 8, taken along line 4-4 of FIG. 1, in which both of the pair of doors are shown in a fully closed position and define a relatively wide door gap therebetween.
Figure 11:
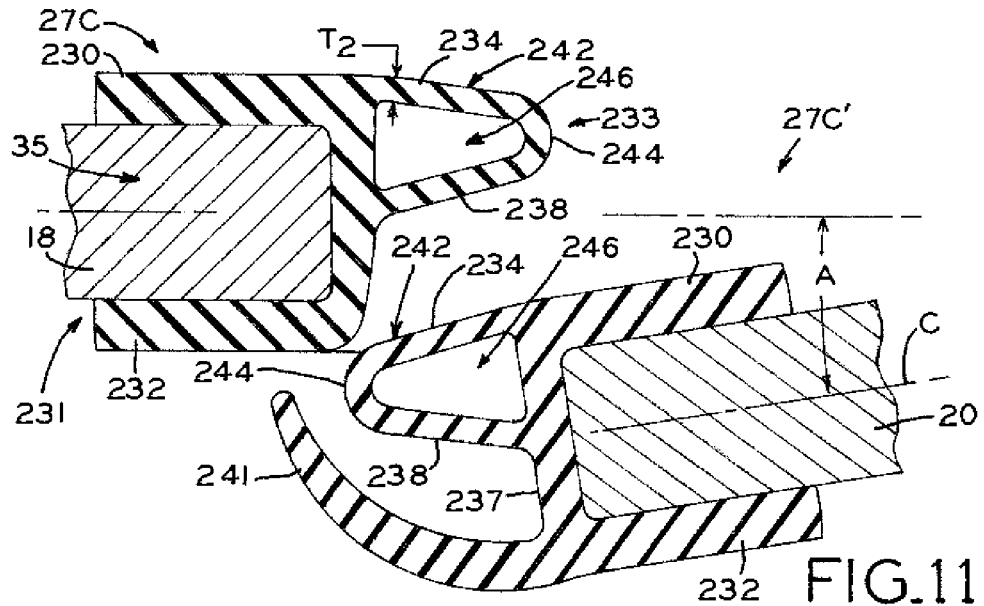
FIG. 11 is a cross-sectional view of another truck door seal in accordance with the present disclosure, taken along line 4-4 of FIG. 1, in which one of a pair doors is shown in a closed position and the other of the pair of doors is approaching a closed position.
Figure 12:
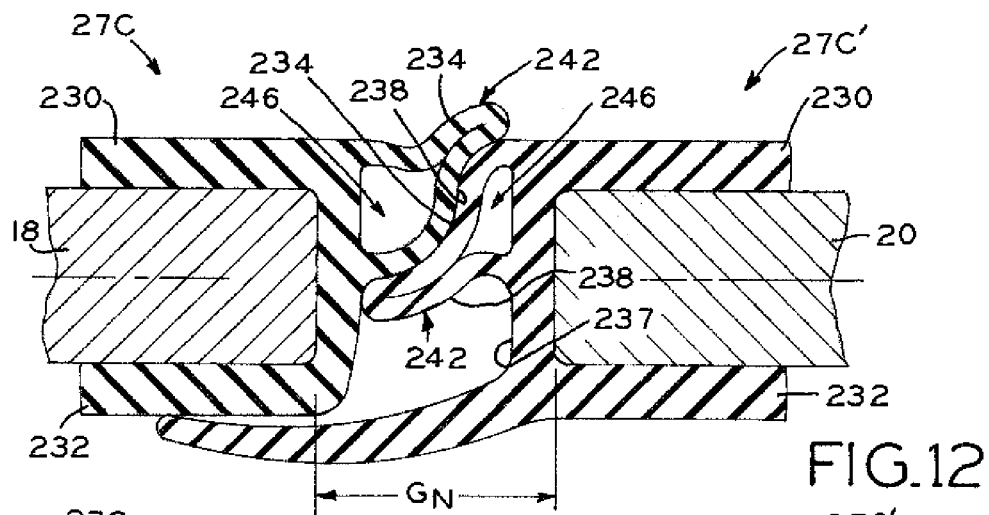
FIG. 12 is another cross-sectional view of the seal shown in FIG. 11, taken along line 4-4 of FIG. 1, in which both of the pair of doors are shown in a fully closed position and define a relatively narrow door gap therebetween.
Figure 13:
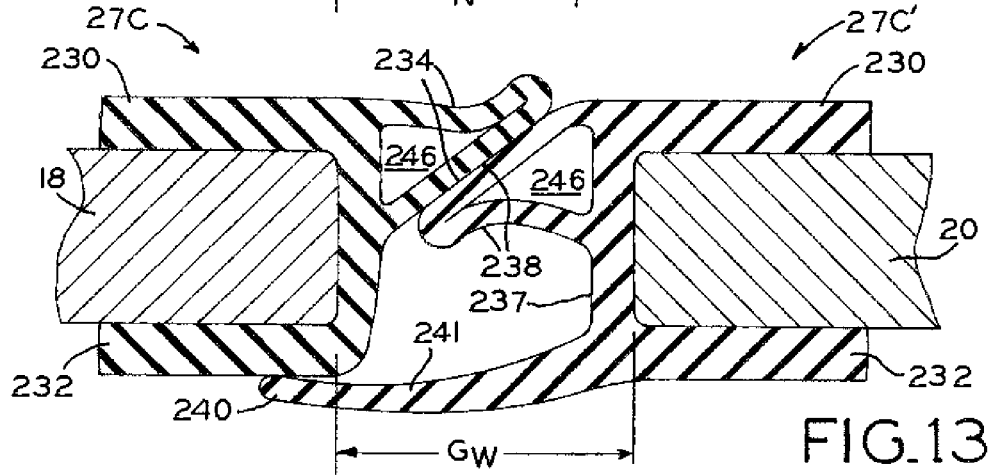
FIG. 13 is another cross-sectional view of the seal shown in FIG. 11, taken along line 4-4 of FIG. 1, in which both of the pair of doors are shown in a fully closed position and define a relatively wide door gap therebetween.
Figure 14:
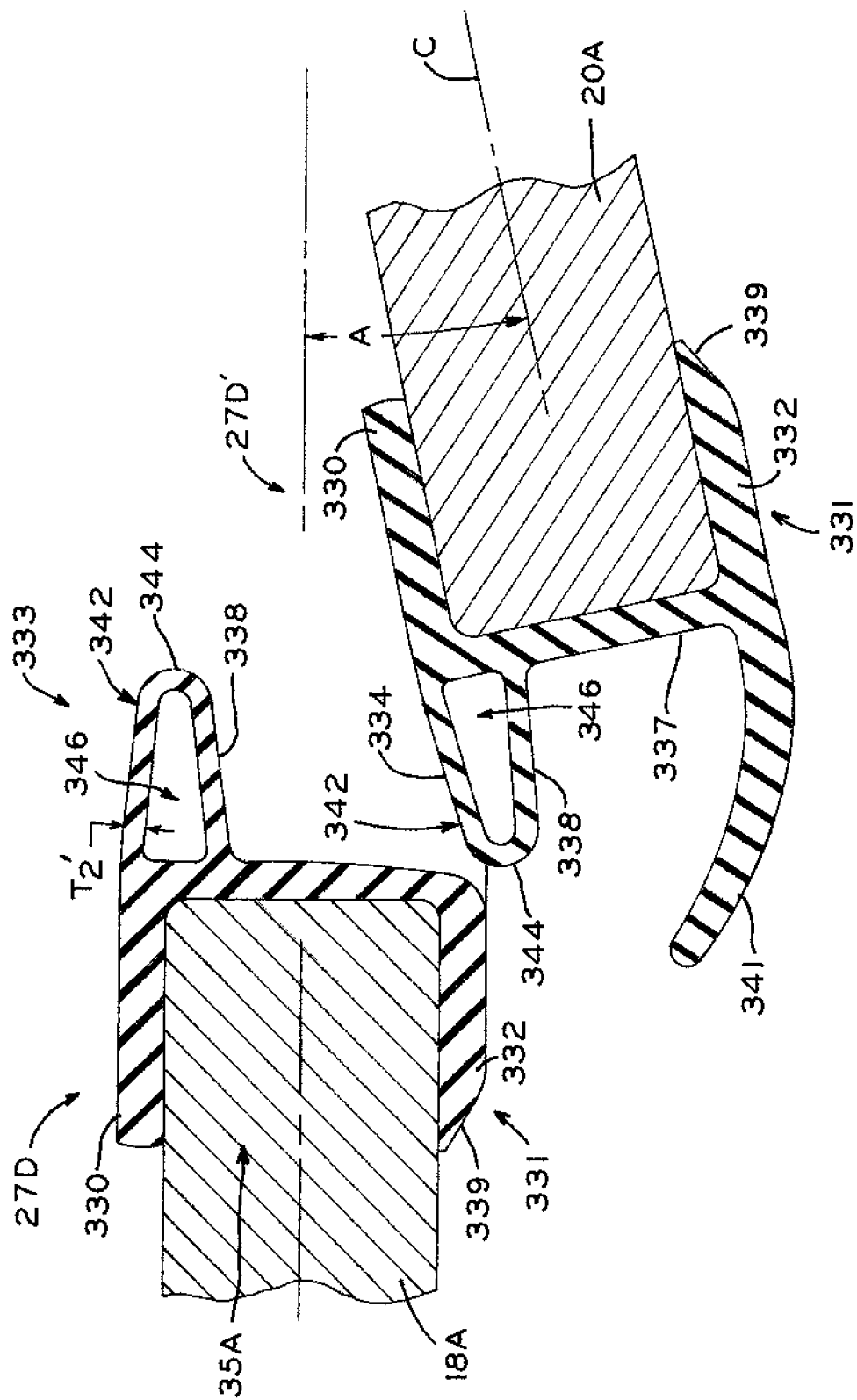
FIG. 14 is a cross-sectional view of another truck door seal in accordance with the present disclosure, taken along line 4-4 of FIG. 1, in which one of a pair thick trailer doors is shown in a closed position and the other of the pair of doors is approaching a closed position.

Several embodiments of cross-sections which may be used for seals 24, 24' are shown and described herein. A first embodiment, shown in FIGS. 3-6, include reference numerals ending in "A," such that seals 24, 24' having a cross section in accordance with the first embodiment can be said to include seal portions 21A, 23A, 25A, 27A and 27A'. FIGS. 7-10 similarly illustrate a cross-sectional view of a second embodiment of seals 24, 24', with reference numerals ending in "B". FIGS. 11-13 illustrate yet another cross-sectional view of a third embodiment of seals 24, 24', with reference numerals ending in "C." FIGS. 14, 15 and 16 illustrate still other cross-sectional views of a third, fourth and fifth embodiment of seals 24, 24', with reference numerals ending in "D," "E" and "F" respectively.

Each of the six embodiments described herein include a set of seal portions with analogous functions and structures, and are generally similar except as described below. As used herein, "seal 24" and "seal 24'" may refer to seals having any such set of seal portions. By extension, generic reference to a seal portion implies that any exemplary set may be used, such that "seal portion 21" may refer to any of seal portions 21A, 21B, 21C, 21D, 21E and 21F. Similarly, "seal portion 23" may refer to any of seal portions 23A-23F, "seal portion 25" may refer to any of seal portions 25A-25F, "seal portion 27" may refer to any of seal portions 27A-27F, and "seal portion 27" may refer to any of seal portions 27A'-27F'.

In an exemplary embodiment, upper, outer, and lower portions 21, 23, 25 of seals 24, 24' share a common cross-section. For one of seals 24, 24' (i.e., left seal 24 of FIG. 1) inner portion 27 has a unique cross-section adapted to mate with inner portion 27'. For the other of seals 24, 24', (i.e., right seal 24' of FIG. 1), inner portion 27' may have the same cross-section as upper, outer, and lower portions 21, 23, 25, or may have a unique cross-section specifically adapted to mate with inner portion 27. Particular cross-sectional geometries of seals 24, 24' are discussed in detail below.

Figure 3:
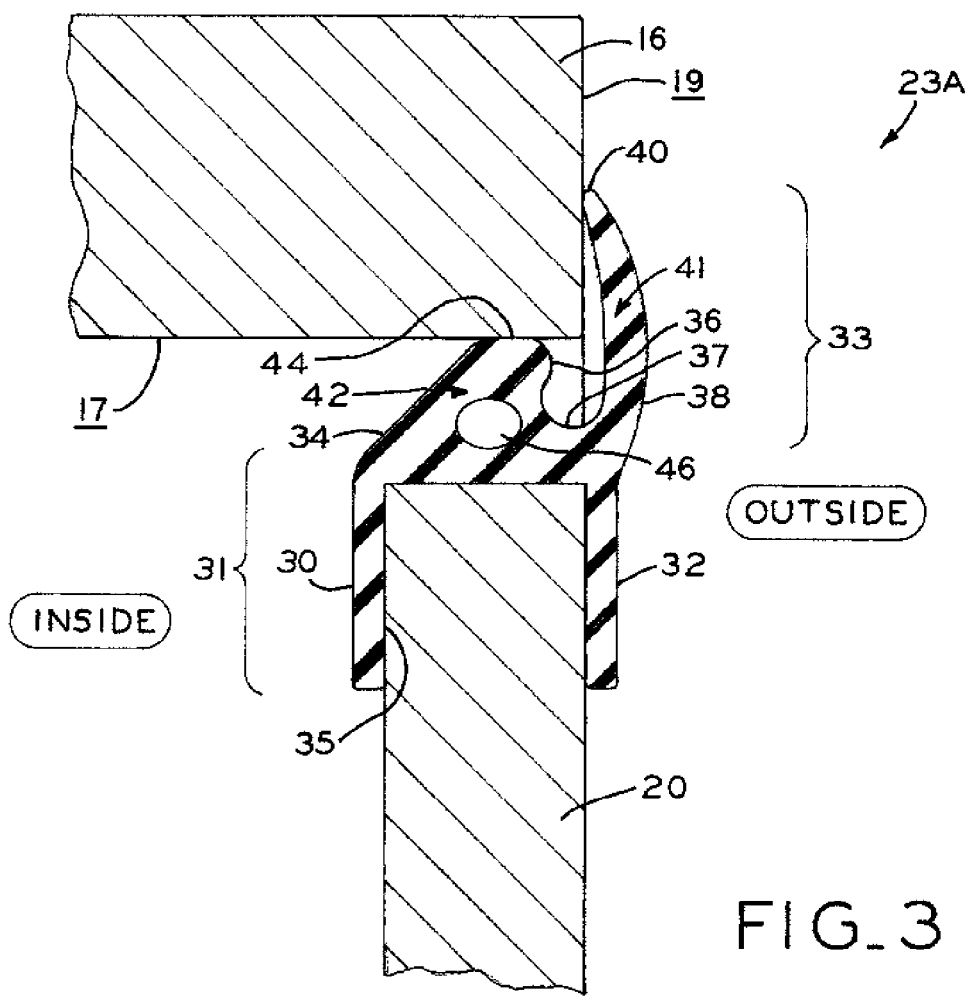
FIG. 3 is a cross-sectional view of a truck door seal in accordance with the present disclosure, taken along line 3-3 of FIG. 1.

Referring now to FIG. 3, outer portion 23A of seal 24 is shown disposed between right door 20 and wall 19 of rectangular frame 16 (FIG. 1). As noted above, outer portion 23A has the same cross sectional geometry as upper and lower portions 21A, 25A. For purposes of simplicity, outer portion 23A is described below, it being understood that upper and lower portions 21A, 25A interact similarly with respective adjacent portions of frame 16 when doors 18, 20 are closed.

Outer portion 23A has a generally deformable, pliable body including mounting portion 31 and sealing portion 33 which are integrally and monolithically formed with one another. Mounting portion 31 includes inside wall 30 and a substantially parallel outside wall 32 defining space 35 for receipt of door 20 therebetween. Sealing portion 33 includes first and second deformable sealing lobes 41, 42, which elastically deform to sealingly engage with adjacent surfaces and provide a fluid-tight seal between door 20 and wall 19, as described below.

In the installed and sealed state shown in FIG. 3, first sealing lobe 41 is substantially aligned with the outer one of the pair of parallel walls 30, 32 of mounting portion 31. First sealing lobe 41 has an elongate, arcuate profile that spans the gap between door 20 and wall 19, and extends further from mounting portion 31 to overlap wall 19, when door 20 is in a closed position (and second sealing lobe 42 is therefore in contact with inner surface wall 17, as shown). In this configuration, sealing lobe 41 is sealing seated upon wall 19. Outer wall 32 is sealingly affixed to the adjacent surface of door 20. Thus, outer wall 32 and sealing lobe 41 cooperate to present an initial, outer barrier to ingress of fluid into cargo box 15 through the gap between door 20 and wall 19.

Figure 6:
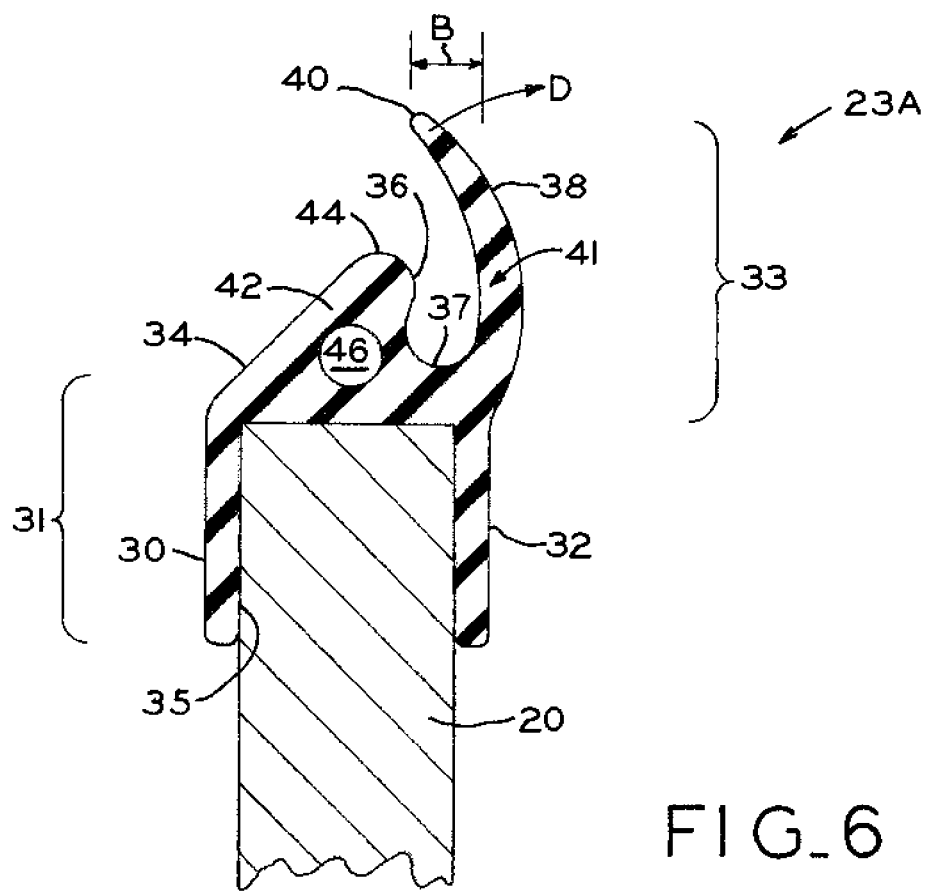
FIG. 6 is cross-sectional view of an outer door seal of FIG. 1 mounted on the edge of a door.

Sealing portion 33 of outer seal portion 23A further includes second sealing lobe 42 which provides a second, inner fluid barrier against such fluid ingress. As best seen in FIG. 6, the cross-section of second sealing lobe 42 of sealing portion 33 includes diagonal wall 34 extending from inside wall 30. Convex hemispherical wall 36 is disposed between diagonal wall 34 and concave hemispherical wall 37, and first sealing lobe 41 extends from concave hemispherical wall 37. Diagonal wall 34 and convex hemispherical wall 36 cooperate to define deformable inner lobe tip 44, which sealingly biases against inner surface 17 of rear frame 16 as shown in FIG. 3. Second sealing lobe 42 includes cylindrical hollow 46, which aids in producing a controlled, repeatable compression of second sealing lobe 42 against inner surface 17 when doors 20 of trailer 10 is closed.

In use, as shown in FIG. 3, first and second sealing lobes 41, 42 cooperate to form redundant, inner and outer fluid-tight seals between the inside and outside of cargo box 15. More particularly, when doors 18 and 20 are closed, second sealing lobe 42 is compressed such that lobe tip 44 elastically deforms. This elastic deformation biases lobe tip 44 against inner surface 17 of rear frame 16 to create an inner fluid-tight seal between doors 18 and 20 and the inner surfaces of the top, side, or bottom portions of rear frame 16. Advantageously, this creates a reliably fluid-tight seal even if the seal is jostled or vibrated (such as during transport).

Concurrently with deformation of second sealing lobe 42 to create an inner seal, deformation of first sealing lobe 41 creates an outer seal. When door 20 is closed, tip 40 of first sealing lobe 41 is deflected from a first position to a second position along a deflection direction D having deflection magnitude B (FIG. 6). By comparison with the undeformed state shown in FIG. 6, it can be seen in FIG. 3 such deflection elastically deforms first sealing lobe 41. This elastically deformation biases deflectable tip 40 toward wall 19, such that lobe 41 is pressed against rear frame 16 to form an outer fluid-tight seal between doors 18 and 20 and the inner surfaces of the top, side, or bottom portions of rear frame 16.

Thus, three sides of doors 18, 20, are redundantly sealed against ingress of fluid by first and second sealing lobes 41, 42. To complete the seal of the rear door assembly shown in FIG. 1, the gap between left and right doors 18, 20 is sealed by left and right inner portions 27A, 27A', which cooperate to form a redundant inner and outer seal as described in detail below. To form this redundant seal, inner seal portion 27A may have a unique cross-section different from seal portion 27A', while inner portion 27A' has the same cross-section as upper, outer and lower portions 21A, 23A, 25A. It is, however, contemplated that a unique cross-section may be used for both of inner seal portions 27A and 27A'.

Figure 4:
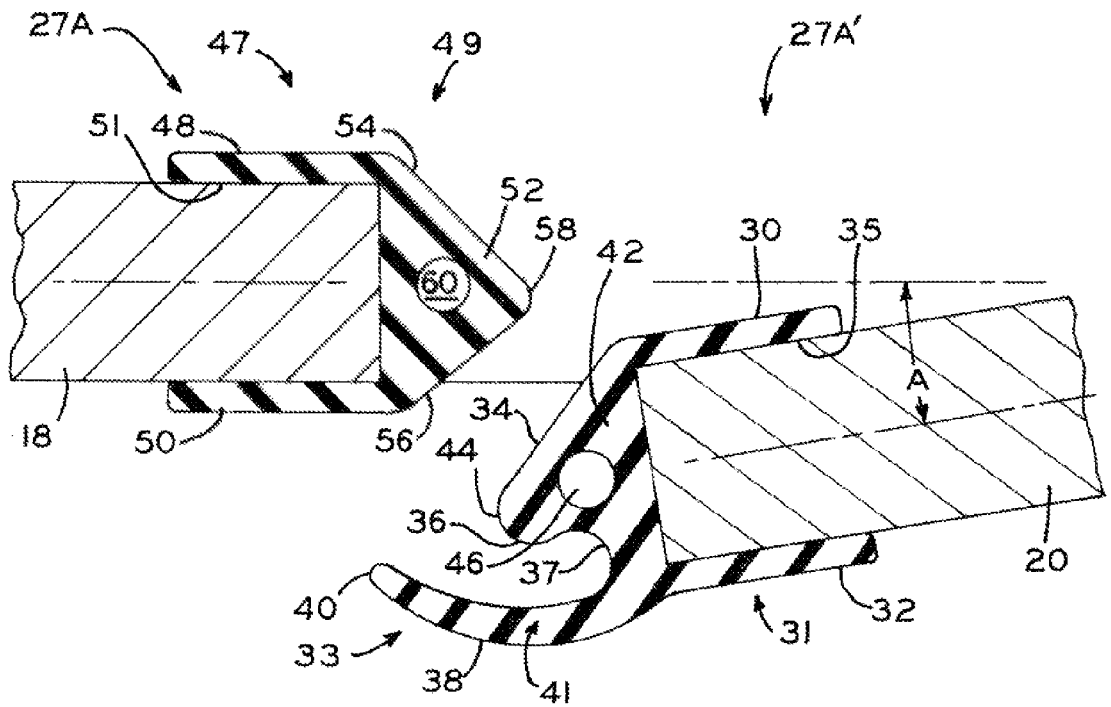
FIG. 4 is another cross-sectional view of the seal shown in FIG. 3, taken along line 4-4 of FIG. 1, in which one of a pair doors is illustrated in a closed position and the other of the pair of doors is approaching a closed position.
Figure 5:
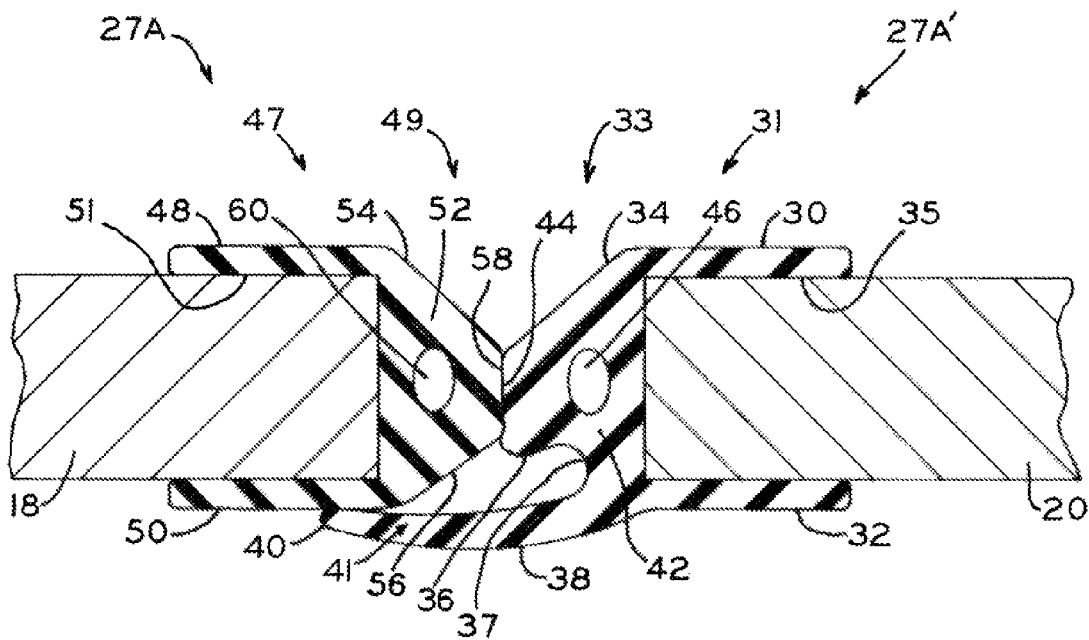
FIG. 5 is another cross-sectional view of the seal shown in FIG. 4, taken along line 4-4 of FIG. 1, in which both of the pair of doors are shown in a fully closed position.

Inner seal portion 27A sealingly engages inner seal portion 27A' as shown in FIGS. 4 and 5. FIG. 4 illustrates a cross-sectional view of doors 18 and 20 in a partially-open configuration, with door 18 in a closed position and door 20 approaching a closed position. Door 20 pivots between the open and closed positions along the direction of arrow A (e.g., around a hinge disposed near outer seal portion 23A). Left door 18 similarly pivots between open and closed positions. In the illustrated embodiment, right door 20 is closed after left door 18 to ensure proper engagement of seals 24, 24', such that a moving right inner seal 27A' (attached to an inner edge of right door 20) engages a stationary left inner seal 27A (attached to an inner edge of left door 18) as shown in FIG. 5 and described in detail below. Of course, left and right seals 27A, 27A' may be interchanged to provide for left door 18 to be closed upon right door 20 as required or desired.

The unique cross-section of left inner seal 27A includes mounting portion 47 and sealing portion 49. As with the cross-section of outer seal portion 23A described above, mounting portion 47 includes inner and outer walls 48, 50 defining space 51 for receipt of left door 18 therebetween. Sealing portion 49 includes a generally triangular sealing lobe 52 which extends from walls 48, 50. Sealing lobe 52 is includes diagonal walls 54 and 56 that meet at inner lobe tip 58. Sealing lobe 52 also includes cylindrical hollow 60 that aids in facilitating compression of triangular sealing lobe 52, as further described below, when doors 18 and 20 are closed.

FIG. 5 illustrates left and right doors 18, 20 in a fully closed position, with left door 18 having in profile the cross-section of left inner seal portion 27A and second closing door 20 having in profile the cross-section of inner seal portion 27A'. In this fully closed position, inner lobe tip 44 of seal portion 27A' deforms against triangular inner lobe tip 58 of seal portion 27A, such that tips are mutually deformed to define an area of contact. Meanwhile, first sealing lobe 41 of seal portion 27A' deflects to bias against outer wall 50 of seal 27A in a similar manner as described above. In this manner, inner lobes 42, 52 deform against one another to form a first, inner seal within the gap between the doors, while first sealing lobe 41 biases against wall 50 of the adjacent seal 27A to form a second, redundant outer seal between the closed doors.

Figure 7:
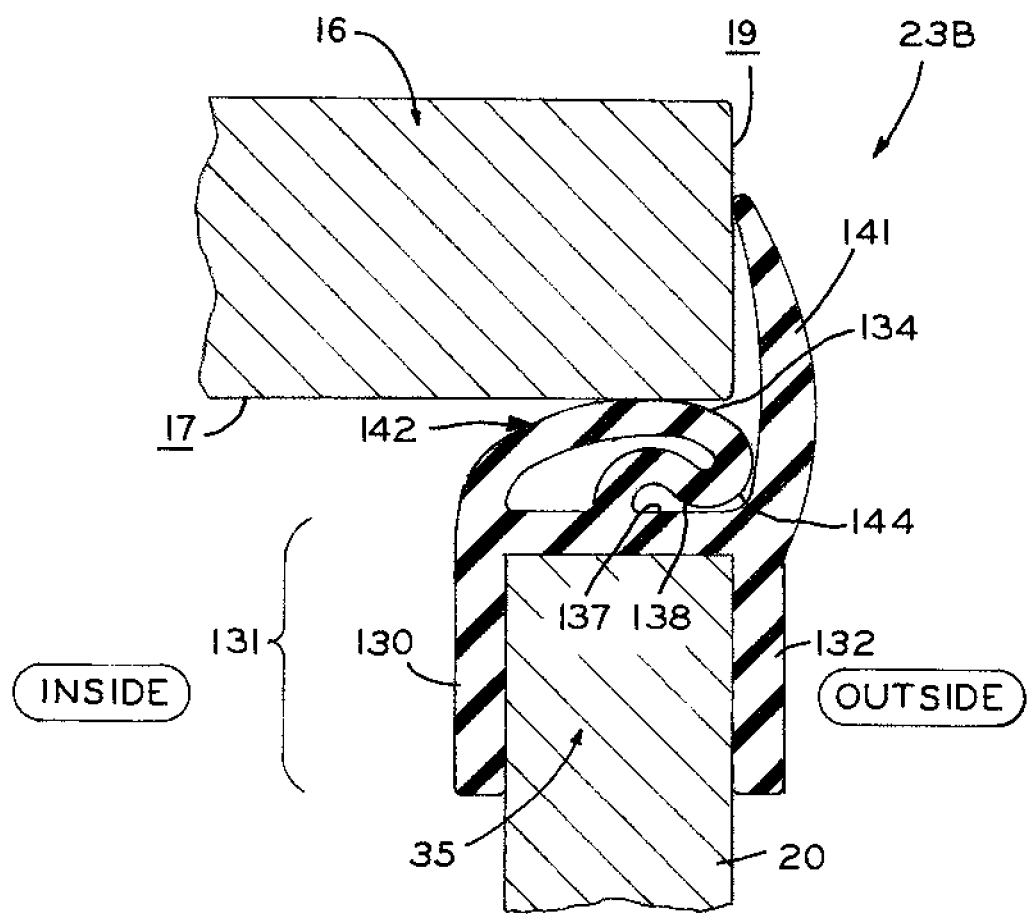
FIG. 7 is a cross-sectional view of another truck door seal in accordance with the present disclosure, taken along line 3-3 of FIG. 1.

Referring now to FIGS. 7-10, a cross-section of a second exemplary embodiment of seals 24, 24' is shown. Seals 27B, 27B' are similar to seals 27A, 27A' described above, and reference numbers in FIGS. 7-10 refer to analogous structures shown in FIGS. 3-6 and described above with respect to seals 27A, 27A'. Similarly to outer seal portion 23A, the cross sectional geometry of outer portion 23B discussed herein may also be used for upper and lower seal portions 21B, 25B, as well as for one of inner seal portions 27B, 27B'. For purposes of the present discussion, right inner seal portion 27B' (FIG. 8) is taken to have the same cross section as outer seal portion 23B (FIG. 7). Advantageously, using a common cross section around the entire periphery of seal 24 facilitates continuity of lobe 142 and provides an enhanced seal as described below.

Figure 8:
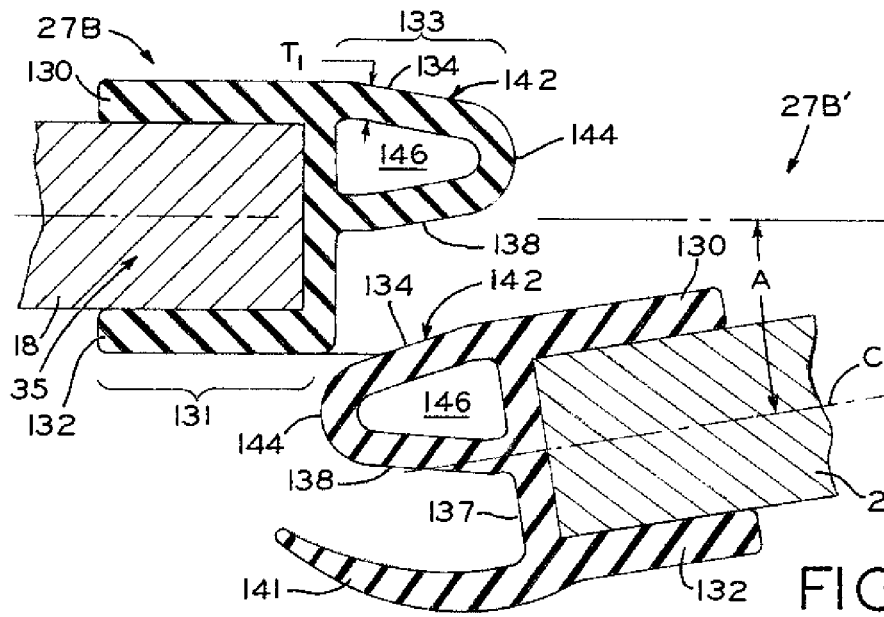
FIG. 8 is another cross-sectional view of the seal shown in FIG. 7, taken along line 4-4 of FIG. 1, in which one of a pair doors is shown in a closed position and the other of the pair of doors is approaching a closed position.

Referring to FIGS. 7 and 8, outer seal portion 23B includes mounting portion 131 and sealing portion 133. Mounting portion 131 includes inside wall 130 and outside wall 132 defining space 35 for receipt of door 20 therebetween. Sealing portion 133 includes first and second deformable sealing lobes 141, 142, which cooperate with adjacent surfaces to provide a fluid-tight seal between door 20 and wall 19. Mounting portion 131 and first sealing lobe 141 are generally similar to mounting portion 31 and first sealing lobe 41 (discussed above) in structure and function, such that repeated discussion of same is not necessary here. However, second sealing lobe 142 of sealing portion 133 is differently shaped and positioned to provide an enhanced inner seal between door 20 and inner surface 17 of rear frame 16.

As shown in FIG. 8, a generally triangular second sealing lobe 142 includes diagonal wall 134 formed on the inside surface thereof, with a generally identical, mirror-image diagonal wall 138 formed opposite the inside surface and facing the outside surface, such that second sealing lobe is generally symmetrical. A deformable inner lobe tip 144 joins diagonal walls 134, 138. Instead of cylindrical hollow 46 described above, a generally triangular hollow 146 is bounded by walls 134 and lobe tip 144, such that the cross-section of second sealing lobe 142 has a substantially constant wall thickness $T_1$. In the illustrated embodiment, wall thickness $T_1$ is about the same as the corresponding thicknesses of walls 130, 132.

Inner wall 134 of second sealing lobe 142 extends outwardly from inner wall 130, such that sealing lobe 142 may be said to join mounting portion 131 at the one end of inner wall 134. On the other hand, outer wall 138 of second sealing lobe 142 joins mounting portion 131 at a location approximately halfway between inner wall 130 and outer wall 132. Put another way, second sealing lobe 142 is "off-center" or asymmetrically disposed with respect to centerline C bisecting seal portion 27B' (FIG. 8) while outer wall 138 runs substantially along centerline C. As discussed below, this asymmetric orientation provides an enhanced liquid-tight seal.

Rather than concave hemispherical wall 37 (discussed above), outer and inner seal portions 23B, 27B' define pocket 137 extending from outer wall 132 of mounting portion 131 to outer wall 138 of second sealing lobe 142. As shown in FIG. 7, for example, pocket 137 is sufficiently large to accommodate lobe tip 144 when second sealing lobe 142 is severely deformed into a sealing configuration. The relatively large size of triangular hollow 146 and the uniform wall thickness of second sealing lobe 142 (described above) facilitate such deformation, so that when outer seal portion 23B is pressed against inner surface wall 17 of rear frame 16, second sealing lobe 142 folds into pocket 137.

As illustrated in FIG. 7, inner wall 134 presents a large surface area for contact with inner surface wall 17, thereby creating a robust liquid-tight seal therebetween. At the same time, pocket 137 is large enough to allow second sealing lobe 142 to elastically deform into the "folded" configuration illustrated in FIG. 7 without pressing against the inner surface of first sealing lobe 141, thereby ensuring that first sealing lobe 141 will remain fully sealingly biased toward wall 19 of rectangular frame 16 even when second sealing lobe 142 is in its fully deformed or "folded" state.

Referring back to FIG. 8, left inner seal portion 27B has a unique profile as compared to the other seal portions of seal 24 (i.e., seal portions 21, 23 and 25). This unique profile allows left inner seal portion 27B to cooperate with right inner seal portion 27B' to redundantly seal the gap between doors 18, 20.

More particularly, left inner seal portion 27B lacks first sealing lobe 141. In all other respects, the profile of left inner seal portion 27B is similar to right inner seal portion 27B'. Thus, left inner seal portion 27B includes mounting portion 131 having inside and outside walls 130, 132 defining space 35 for receipt of door 18 therebetween. Second sealing lobe 142 again includes lobe tip 144 joining inside and outside walls 134, 138, which cooperate to define a generally triangular hollow 146.

Figure 9:
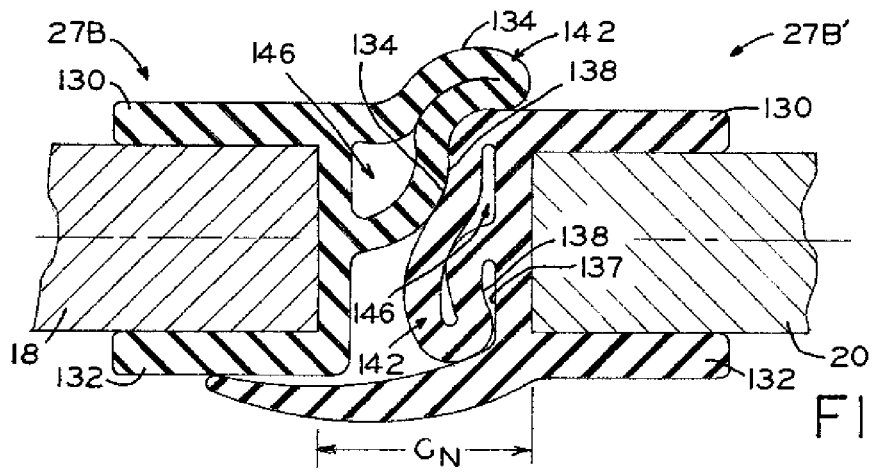
FIG. 9 is another cross-sectional view of the seal shown in FIG. 8, taken along line 4-4 of FIG. 1, in which both of the pair of doors are shown in a fully closed position and define a relatively narrow door gap therebetween.

The lack of an outer sealing lobe in seal portion 27B facilitates the redundantly sealed configuration shown in FIG. 9. Inner seal portion 27B', which has the same cross-section as outer seal portion 23B of FIG. 7, allows severe deformation of lobe 142 into pocket 137 when doors 18, are moved from the open configuration (FIG. 8) to the closed configuration (FIG. 9). In the case of inner seal portion 27B', however, this deformation is caused by interaction between the pair of second sealing lobes 142 of left and right inner seal portions 27B, 27B', rather than interaction between second sealing lobe 142 and wall 17 (FIG. 7).

As illustrated in FIG. 9, this lobe-on-lobe interaction causes mutual elastic deformation, resulting in a tortuous, arcuate contact profile therebetween. The contacting portions of the pair of lobes 142 also occupies a large proportion of the area between inside wall 134 of right-side lobe 142 (of right inner seal portion 27B) and outside wall 138 of the left-side lobe 142 (of left inner seal portion 27B), as illustrated. Advantageously, this tortuous, large-area contact provides a robust liquid-tight inner seal between doors 18, 20 which is resistant to outside forces such as vibration, shock and wind. In addition to the seal provided by interaction between the pair of sealing lobes 142, first sealing lobe 141 of seal portion 27B' also cooperates with outer wall 132 of seal portion 27B to create an outer seal, as noted above, thereby isolating the inner seal from most or all of the elements outside cargo box 15 (FIG. 1).

In FIG. 9, a relatively narrow gap width $G_N$ is shown between left door 18 and right door 20. However, seals 24, 24' are capable of providing a liquid-tight seal across a range of gap widths between doors 18, 20. Referring to FIG. 10, a much wider gap width $G_W$ is shown in conjunction with inner seal portions 27B, 27B'. As illustrated, lobe-on-lobe interaction still causes mutual elastic deformation, such that contact between inside wall 134 of right-side lobe 142 (of right inner seal portion 27B) and outside wall 138 of the left-side lobe 142 (of left inner seal portion 27B) still occurs. Further, it can be seen that first sealing lobe 141 is long enough to ensure that deflectable tip 140 can still contact, and bias against outside wall 132 in similar fashion to first sealing lobe 41 described above. In an exemplary embodiment, the gap widths $G_N$, $G_W$ accommodated by inner seal portions 27B, 27B' may be as small as 0.20 inches, 0.25 inches, or 0.30 inches or as large as 0.63 inches, or any range defined by any of the foregoing values.

Advantageously, maintaining a common cross section of lobe 142 around the entire periphery of seals 24, 24' may cooperate with the use of miter-cut edges (shown in FIGS. 2A-2C and described in detail below) to create continuity of walls 134, 138 and tip 144 at the corners of seals 24, 24'. Put another way, hollows 146 may create a continuously sealed cavity around the entire periphery of seals 24, 24', including the corners thereof. Thus, a continuous lobe extends uninterrupted around the entire periphery of doors 18, 20, eliminating potential leak paths at the corners of doors 18, 20, in the same manner as along the edges of doors 18, 20. The cavity defined by hollows 146 similarly extends uninterrupted around the entire periphery of seals 24, 24'.

However, it is contemplated that special unique cross sections may be used for both left and right inner seal portions 27B, 27B'. For example, second sealing lobe 142 may be shortened on right inner seal portion 27B', i.e., the inner seal portion of the later-closed truck door, which is right door 20 in the illustrated embodiment. Shortening this second sealing lobe 142 while leaving all other second sealing lobes the same height may, for example, be employed where narrow gap width $G_N$ (FIG. 9) is observed, in order to avoid impingement of lobe 142 on outside wall 132 of left inner seal portion 27B as right door 20 is closed. Similarly, left inner seal portion 27B may have a different, unique cross-section as compared to all other sealing portions, such as by relocating or reconfiguring the geometry of second sealing portion 142, in order to optimize the fluid-tightness of the seal. It is contemplated that continuity of lobes 142 around the periphery of seals 24, 24' may also be maintained with alternative manufacturing methods, such as injection-molded corners (as described below).

Referring now to FIGS. 11-13, a cross-section of another exemplary embodiment of seals 24, 24' is shown. Seals 27C, 27C' are similar to seals 27B, 27B' described above, and reference numbers in FIGS. 11-13 refer to analogous structures shown in FIGS. 8-10 and described above with respect to seals 27B, 27B'. However, lobes 242 define thickness $T_2$ which is less than thickness $T_1$, and is less than the corresponding thicknesses defined by mounting portion 231. In an exemplary embodiment, thickness $T_2$ is about 0.085 inches. This reduced thickness $T_2$ facilitates easier elastic deformation of the pair of lobes 242 when doors 18, 20 are in the closed position, as shown in FIGS. 12 and 13. Thus, the tortuous, arcuate path defined by contact between inside wall 234 of right-side lobe 242 (of right inner seal portion 27B') and outside wall 238 of the left-side lobe 242 defines an even larger contact area therebetween.

Further, the embodiment illustrated 11-13 includes a longer, more inwardly curved first sealing lobe 241. This additional length and curve increases the biasing force applied by sealing lobe 241 against outer wall 232 when doors 18, 20 are in the closed configuration, as shown in FIGS. 12 and 13.

Referring now to FIG. 14, a cross-section of yet another exemplary embodiment of seals 24, 24' is shown. Seals 27D, 27D' are similar to seals 27C, 27C' described above, and reference numbers in FIGS. 11-13 refer to analogous structures shown in FIGS. 11-13 and described above with respect to seals 27C, 27C'. However, inner and outer walls 330, 332 of mounting portions 331 are spaced farther apart to accommodate larger doors 18A, 20A. For example, doors 18, 20 may have a thickness of about 0.50 inches, while doors 18A, 20A may have a thickness of about 0.75 inches. Outer walls 332 of seals 27D, 27D' also include a chamfered edge 339, which avoids or minimizes application of forces to outer wall 339 (such as by a truck operator opening and closing doors 18A, 20A which might otherwise urge seals 27D, 27D' to "roll off" of doors 18A, 20A. Seals 27A, 27A', 27B, 27B', 27C and/or 27C' may include similar such chamfers.

Lobes 342 of seals 27D, 27D' may define thickness $T_2'$ which is less than thickness $T_2$ described above with respect to seals 27D, 27D', and is less than the corresponding thicknesses defined by mounting portion 331. In an exemplary embodiment, thickness $T_2'$ is about 0.054 inches.

Referring now to FIGS. 15 and 16, cross-sections of two additional exemplary embodiments of seals 24, 24' is shown. Seals 27E and 27F are similar to seals 27A, 27A' described above, and reference numbers in FIGS. 15 and 16 refer to analogous structures shown in FIGS. 3-6 and described above with respect to seals 27A, 27A'. Seals 27E and 27F are adapted to be fitted onto a first-closed door of a pair of trailer doors, such as left door 18 in the illustrated embodiment. Each of the illustrated inner seal portions includes an additional feature adapted to reinforce the sealing lobe of the seal and to prevent or restrict a rolling motion of the seal inwardly in a direction toward the interior of the trailer upon closing of the second door as the sealing lobes of the pair of seals engage one another.

Referring to FIG. 15, for example, inner seal portion 27E includes auxiliary reinforcement lobe 70 adapted to face the interior of cargo box 15 (FIG. 1). Reinforcement lobe 70 is disposed substantially at the junction between wall 48 and diagonal wall 54 of sealing lobe 52. Auxiliary reinforcement lobe 70 provides additional material at this junction, which strengthens seal portion 27E and acts to prevent the above-described rolling of seal portion 27E upon contact with seal portion 27A' (FIG. 5) as sealing lobe 42 of seal portion 27A' engages sealing lobe 52 of seal portion 27E.

Referring to FIG. 16, in a still further embodiment, wall 48 of inner seal portion 27F may include a pocket or hollow portion 72 disposed proximate the junction between wall 48 and diagonal wall 54 of sealing lobe 52. A reinforcing strip of steel 74, or other rigid material such as a rigid plastic, for example, may be received within pocket 72, which reinforces wall 48 of seal portion 27F and aids in preventing the above-described rolling of seal portion 27F upon contact with seal 27A' (FIG. 5) as sealing lobe 42 of seal portion 27A' engages sealing lobe 52 of seal portion 27F.

2. Seal Installation and Use

As noted above, seals 24, 24' are unitary, monolithic seals having upper, outer, lower and inner seal portions 21, 23, 25, 27 (or 27') joined by fused corners. In an exemplary embodiment, seals 24, 24' are also made from a resiliently elastically deformable material, such as EPDM (see also "Methods of Seal Production" section below).

For simplicity, installation will be discussed with respect to left seal 24 on left door 18. Installation of any seal made in accordance with the present disclosure to any door or panel can be accomplished in a similar manner.

To install seal 24 to left door 18 (FIG. 1), any two adjacent corners of seal 24, such as the top corners, are attached to the appropriate corresponding corners of door 18. Opposing corners may also be used as the first two corners of attachment. In an exemplary embodiment, seal 24 may be sized to require a slight stretch of seal 24 to bring the second seal corner into alignment with the second door corner. For example, the seal may be stretched as little as 3% or as much as 15% or 30%, or may not be stretched at all. The third and fourth corners are similarly attached to their respective door corners, leaving seal 24 loosely attached to door 18.

Next, one of seal portions 21, 23, 25, 27, such as upper seal portion 21, is attached to the corresponding edge of door 18. To effect such attachment, inside and outside walls 30, 32 are aligned with door 18 and worked until space 35 is fully occupied by door 18. Once fully installed, door 18 is encapsulated by the closed profile of seal 24, i.e., the entire outer periphery of door 18 is covered over by seal 24. As a result of this encapsulation, no leak paths are present around the periphery of the door.

Optionally, adhesive may be applied to space 35 prior to, during or after the seal portion is attached to the door edge. In one exemplary embodiment, a special spreader tool with an adhesive nozzle may simultaneously seat space 35 on door 18 while applying a layer of adhesive therebetween. In another embodiment, seals 24, 24' may be mechanically fastened to doors 18, 20, such as by driving screws through seals 24, 24' and into respective doors 18, 20. For example, screws may be driven through inside or outside walls 30, 32 (or 130, 132) of mounting portion 31 (or mounting portion 131), through concave hemispherical wall 37, or through pocket 137.

Advantageously, the attachment of seal portions 21, 23, 25, 27 to corresponding door edges after the securement of the seal corners to the door corners ensures even tension throughout the seal material (provided such tension is imparted to the seal material, i.e., by stretching). This even tension promotes even seal seating against the adjacent surfaces of rear frame 16, as described above, which in turn promotes a long-lasting fluid-tight seal.

Right seal 24' is then installed to right door 20 in a similar manner. With both of seals 24, 24' so installed, effecting the seal is accomplished by simply closing doors 18, 20 in the designated order. The first door to be closed is the door with inner seal portion 27, i.e., the inner seal portion lacking either of first sealing lobes 41, 141. In the illustrated embodiment shown in the figures, this is left door 18. The first door may be secured in the closed position, such as by activating latch assembly 22. The second door is then closed over the first door, which engages right inner seal portion 27' with left inner seal portion 27 as described above. The second door may similarly be locked by activating the other of latch assemblies 22.

Where inner seal portion 27F with solid strip 74 (FIG. 16) is used, solid strip 74 may be made shorter than the final stretched length of seal portion 27F (i.e., the seal length after installation on one of doors 18, 20). As seal portion 27F is stretched during installation, solid strip 74 can move within pocket 72 to effectively allow pocket 72 to lengthen while solid strip 74 maintains its original length. Thus, solid strip 74 will still provide additional support to most of the seal portion in which it is installed.

Advantageously, the range of gap widths accommodated by seals 24, 24', (i.e., gaps between narrow gap width $G_N$ and wide gap width $G_W$ described above and illustrated in FIGS. 9 and 10) allows seals 24, 24' to be retrofitted on a wide variety of trailers in differing states of repair. Moreover, seals 24, 24' can be used as frame seals for many applications, such as for overseas shipping containers, exterior doorways, or any other application in which a door must sealingly engage a correspondingly sized aperture.

As noted herein, seals 24, 24' are unitary, monolithic and elastically deformable devices. These unique qualities allow seals 24, 24' to be collapsed into a small package, such as a typical cube-type shipping box, without compromising the integrity or effectiveness of seals 24, 24'. In an exemplary embodiment, a shipping box sized to fit both seals 24, 24' is approximately 13 inches wide, 13 inches long and 13 inches tall. Advantageously, seals 24, 24' may be folded, rolled, or stuffed into such a box, and the box may then be shipped to a remote location where the seal is unfolded, unrolled or unstuffed to be applied to a flat panel (such as rectangular doors 18, 20) defining a maximum dimension substantially larger than the maximum dimension of the shipping box. Advantageously, seals 24, 24' do not permanently deform (i.e., no deformation set occurs) in the shipping box, such that seals 24, 24' easily "spring back" into their originally formed shape after being removed from the package.

In addition, the packability of seals 24, 24' allow extra seals 24, 24' to be compactly stored and procured on short notice. For a seal having inner seal portion 27F (FIG. 16) having solid strip 74, solid strip 74 may be pliable enough to be folded or rolled, or may be installed separately within pocket 72 after unpacking the seal with seal portion 27F.

3. Methods of Seal Production

In an exemplary embodiment, each of the seal portions 21, 23, 25, 27, 27' are produced independently by extruding pliable material at an elevated temperature through an appropriately shaped die. As noted above, a common extrusion may be used for upper, outer, and lower seal portions 21, 23, 25. A single continuous strip of extruded material may therefore be produced and cut to length for these three seal portions, with the same or a unique extrusion profile used for the fourth, inner seal portion 27 or 27' as described above. Respective ends of the four seal portions are then fused to one another to form seals 24, 24' into unitary, monolithic truck door seals having a generally rectangular central opening 28 (FIG. 1). Methods of fusing the corners in accordance with the present disclosure are discussed in detail below.

As mentioned above, seals 24, 24' may be made of a resilient, elastically deformable/compressible material. Such materials may include natural rubber, silicone, isoprene, ethylene propylene ("EPM") or ethylene propylene diene monomer ("EPDM") rubber, a mixture of cross-linked EPDM rubber and polypropylene, such as SANTOPRENE® (SANTOPRENE® is a registered trademark of the Exxon Mobil Corporation of Irving, Tex.), or any other suitable material. In an exemplary embodiment, the material used for seals 24, 24' has good resistance to compression set, resists degradation from exposure to UV light and other environmental impacts, and remains pliable in cold temperatures.

In the illustrated embodiment of the present disclosure, the seal material is made from EPDM, which has been found exhibit the above-mentioned exemplary qualities for superior longevity in the environments normally encountered by shipping trailers. For example, normal use of a truck door seal made in accordance with the present disclosure may subject the seal to repeated deformations over time, such as by repeated opening and closing of the doors to which the seal is attached, or to vibrations and deformations resulting from movement of the vehicle with which the doors are associated. Forming the seal from a material highly resistant to compression set, such as EPDM, renders the seal well-suited for use in the potentially harsh service environments encountered in the shipping industry. Even after repeated deformations, the above-mentioned seal materials maintain their original shape and elasticity and are therefore able to maintain the desired sealing effect over time. In an exemplary embodiment EPDM having a durometer of about 60 may be used. When the seals are monolithic, the durometer of the entirety of such seals is the same throughout respective seal cross sections.

Two exemplary methods of fusing the seal portion corners include fusing the seal portions at a miter cut and injection molding the seal corners. In the first method, seals 24, 24' are miter cut at their edges at 45° angles and heat fused. The heat fusing of the extrusion members may be effected in various ways including fusing of mitered edges and injection molding.

In an exemplary embodiment, the extrusion members may be extruded from compressible, resilient elastomeric material that is cut to have mitered ends, as noted above. Referring to FIG. 2D, showing an apparatus for fusing miter seal corners to one another, these mitered ends are then inserted into seal portion holders 504, which each include lower block 506, upper block 508, and center block 510. When assembled as shown in FIG. 2D, blocks 506, 508, 510 cooperate to define mirror-image apertures 512 corresponding to the cross-section of a seal portion, such as seal portions 21, 23. When seal portions 21, 23 are disposed within respective apertures 512, each seal portion 21, 23 is well-supported such that the shape is maintained through the rest of the fusing process.

Figure 2A:
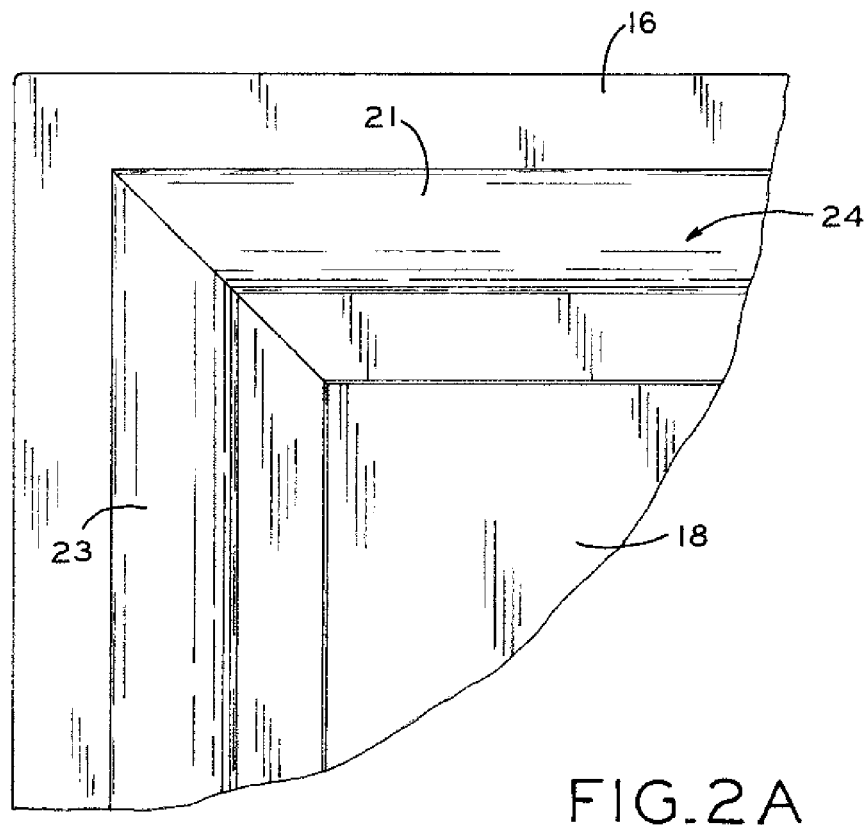
FIG. 2A is a fragmentary view of a corner of the rear frame and door structure of the semi-trailer truck of FIG. 1.

Apertures 512 each define a longitudinal axis A (FIG. 2D) corresponding to a longitudinal axis of seal portions 21, 23. The longitudinal axis of seal portions 21, 23 may be considered to be, for example, an axis parallel to the direction of extrusion of seal portions 21, 23. In the case of seal portions The ends of seals portions 21, 23 are miter-cut at a certain angle, such as 45-degrees as discussed above, such that the pair of longitudinal axes A form a 90-degree angle when the ends are abutted to one another as shown in FIGS. 2A-2C. Inner faces 514 of seal holders 504 each define the same angle with respect to the respective longitudinal axes of apertures 512, such that end surfaces 516, 518 of seal portions 21, 23 are flush with inner faces 514 when seal portions 21, 23 are secured within apertures 512.

With seal portions 21, 23 secured within apertures 512, ribbon 502 is positioned between seal holders 504, and seal holders 504 are then moved inwardly (e.g., along slide 505) toward one another into abutting contact, and are held together. Heat is locally applied to simultaneously heat end faces 516, 518 of seal portions 21, 23 and melt ribbon 202, such as by direct conduction through seal holders 504, for example. This heat operates to fuse the mitered ends together. Alternatively, an uncured liquid may be applied to one or both of seal portions in lieu of ribbon 202. As illustrated in FIG. 2C, the material of ribbon 202 may melt away within cavity 146 such that the pair of cavities 146 of seal portions 21, 23 form one continuous cavity traversing the newly formed corner between seal portions 21, 23.

Once the material has sufficiently hardened and/or cured and with seal holders 504 still in abutting contact, upper blocks 508 are moved upwardly (e.g., along slides 509) and center block is moved or pivoted away, leaving seal portions 21, 23 exposed. The fused seal portions may then be removed by lifting away from lower block 506.

In some instances, the extrusion members may retain a residual heat from the extrusion process, which allows the mitered ends of separate extrusion members to fuse to one another when the ends are held together without the use of ribbon 202.

The one-piece monolithic seal, after heat fusing, may then be installed onto a semi-trailer truck door by stretching the seal around the edges of the door as described above.

In the second method of fusing the seal portion corners, each seal portion may have regular or plain-cut ends, i.e., the cut face may be transverse to the direction of extrusion. These cut ends may then be placed adjacent one another beneath an injection molding head and adjacent an injection-molding die, with a corner of the cuts touching or nearly touching. The void at the seal corner is then filled by injecting molten seal material into the injection-molding die, and allowing such molten rubber to contact and fuse to each seal end.

However the corners are fused, the first and second sealing lobes 41, 42 (or 141, 142, 241, 242, etc.) form a continuous and uninterrupted "bulbs" around the entire periphery of the seal. To create this continuity of the sealing lobes, the material of one seal portion lobe is directly joined to the material of another seal portion lobe by the corner structure. In the case of a mitered joint, for example, the sealing lobes of one seal portion extend outwardly at 45-degrees to meet and are directly fused to complementary sealing lobes also extending at 45-degrees. In the case of an injection-molded corner, the cross-sectional geometry of the corners is controlled by the injection-molding die for a given corner to ensure that the lobes are similarly continuous through the corners.

The injection-molding die may have a different cross-sectional geometry compared to the two adjacent seal portion cross-sections (which may be different from one another, as discussed above). However, an exemplary injection-molding die is formed to create corners having substantially the same cross-sectional area as the adjacent seal portions. Keeping the cross-sectional area constant throughout the corners, whether by injection molding or fusing mitered corners, prevents the formation of "harder" or otherwise dissimilar material properties at the seal corners, and ensures that the seal will have consistent stretch, deformability and pliability throughout. To further enhance this consistency in the physical properties of seals 24, 24', the injection-molded corners will have voids adjacent to cylindrical and/or triangular hollows 46, 146 (FIGS. 4 and 8). The voids leave an absence of material next to hollows 46, 146 to ensure that second deformable sealing lobes 42, 142 will deform near the corners in the same manner as in the middle of a respective seal portion.

To produce seals 24, 24' with injection-molded corners, up to six separate dies may be used. An upper/outside die is formed to fuse the corners between upper portion 21 and outer portion 23 of seals 24, 24'. A lower/outside die is a mirror image of the upper/outside die and forms the corners between lower portion 25 and outer portion 23 of seals 24, 24'. A left upper/inside die is specially adapted to merge the dissimilar cross-sections of upper portion 21 and inner portion 27 of seal 24. A left lower/inside die is a mirror image of the left upper/inside die and forms the corner between lower portion 25 and inner portion 27 of seal 24.

It is also contemplated that the lower/outside and upper/outside corners may be formed by a single die, bringing the total number of dies down to five. Further, an identical cross-section can be used for all four sides on one of seals 24, 24', potentially allowing the upper/inside and lower/inside corners to be formed by the same die used for the corresponding outside corners. In this case, the total number of dies required for the corners may be as few as three.

A right upper/inside die is optional, and is used where right inner seal portion 27' has a different, unique cross-sectional geometry as compared to the other portions of seal 24'. Where used, the right upper/inside is specially adapted to merge the dissimilar cross-sections of upper portion 21 and inner portion 27' of seal 24'. A right lower/inside die is used in conjunction with the right upper/inside die, and is a mirror image of the right upper/inside die for forming the corner between lower portion 25 and inner portion 27' of seal 24'. Where a uniform cross-sectional seal geometry is used for all four sections of right seal 24', the upper/outside die can be used for the lower/inside corner of right seal 24', and lower/outside die can be used for the upper/inside corner of right seal 24'.

While this invention has been described as having an exemplary design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A door seal assembly for use in sealing a periphery of each of a pair of doors, said seal assembly comprising:
    a first monolithic seal made of a resilient, elastically deformable material, said first seal including:
        a first plurality of seal portions;
        a first plurality of seal corners, each of said first plurality of seal corners integrally joining two of said first plurality of seal portions; and
        said first plurality of seal portions joined by said first plurality of seal corners to form a closed profile sized to fit a first truck door, said first plurality of seal portions cooperating to define a first sealing lobe extending continuously around a periphery of said first seal; and
    a second monolithic seal made of a resilient, elastically deformable material, said second seal including:
        a second plurality of seal portions;
        a second plurality of seal corners, each of said second plurality of seal corners integrally joining two of said second plurality of seal portions; and
        said second plurality of seal portions joined by said second plurality of seal corners to form a closed profile sized to fit a second truck door, said second plurality of seal portions cooperating to define at least one second sealing lobe extending continuously around a periphery of said second seal and sized to sealingly engage said first sealing lobe of said first monolithic seal along respective adjacent edges of said first and second doors,
    said first and second sealing lobes mutually elastically deformable against one another when said first truck door and said second truck door are in a closed position, such that the interaction between said first and second sealing lobes creates a tortuous, arcuate contact profile wherein each of the first and second sealing lobes define a convex-to-concave inflection, whereby a robust liquid-tight inner seal between said first truck door and said second truck door is created which is resistant to outside forces such as vibration, shock and wind.

2. The seal assembly of claim 1, wherein each of said first and second pluralities of seal portions includes a pair of opposing mitered ends, respective adjacent pairs of said mitered ends fused to one another to respectively form said first and second pluralities of seal corners.

3. The seal assembly of claim 2, wherein said first and second sealing lobes each define a cavity, said cavity extending uninterrupted around said peripheries of said first and second seals, respectively.

4. The seal assembly of claim 1, wherein said first monolithic seal includes, in cross section:
    a mounting portion including inner and outer walls, said walls spaced from one another and defining therebetween a space sized to receive an edge of the door; and
    a deformable outer sealing lobe extending from said periphery of said seal, said outer sealing lobe substantially aligned with at least one of said walls and extending farther from said mounting portion than said first sealing lobe.

5. The seal assembly of claim 4, wherein said first sealing lobe has a rounded profile and said outer sealing lobe has an elongate, arcuate profile.

6. The seal assembly of claim 4, wherein said first sealing lobe is asymmetrically oriented with respect to an axis bisecting said mounting portion.

7. The seal assembly of claim 1, wherein:
    said first and second pluralities of seal portions each comprise four seal portions arranged in a rectangular profile, and
    each of said first and second pluralities of seal corners forms a generally right angle.

8. A method of producing the door seal assembly of claim 1, the method comprising:
    procuring a first seal portion holder, the first seal portion holder comprising:
        a first recess defining a longitudinal axis, and
        a first inner face defining an angle with respect to the longitudinal axis of the first recess;
    procuring a second seal portion holder, the second seal portion holder comprising:
        a second recess defining a longitudinal axis, and
        a second inner face defining a second angle with respect to the longitudinal axis of the second recess;
    placing a first seal portion of said first or second plurality of seal portions into the first seal portion holder, the first seal portion having a miter-cut end, said step of placing the first seal portion including placing the miter-cut end substantially flush with the first inner face;
    placing a second seal portion of said first or second plurality of seal portions into the second seal portion holder, the second seal portion having a miter-cut end, said step of placing the second seal portion including placing the miter-cut end substantially flush with the second inner face; and fusing the first seal portion to the second seal portion.

9. The method of claim 8, wherein said step of fusing comprises:
placing a ribbon between the miter-cut ends of the first and second seal portions; and
heating the miter-cut ends and the ribbon.

10. The method of claim 9, further comprising the additional step of:
repeating said fusing step on additional seal portions of said first or second plurality of seal portions to create said first or second monolithic seal with the respective closed profile.

11. The method of claim 10, wherein the additional seal portions comprise two additional seal portions, and the closed profile defines a rectangular profile.

12. The method of claim 10, further comprising the additional step of:
installing the seal onto the first or second truck door, the first or second truck door having a profile corresponding to the closed profile.

13. The method of claim 12, wherein said step of installing further comprises:
stretching the seal over edges and corners of the door.

14. The method of claim 8, further comprising, prior to said fusing step, the additional step of:
moving said first seal portion holder inward toward said second seal portion holder.

15. The sealing assembly of claim 1, wherein said first and second sealing lobes each form a cavity in cross-section such that said first and second sealing lobes are hollow.

16. A sealing assembly for sealing a gap between first door and a second door, said assembly comprising:
a first seal connected to a first inside edge of said first door and having a first sealing lobe that defines a first cavity, said first sealing lobe disposed substantially entirely inwardly of a first centerline bisecting said first seal; and
a second seal connected to a second inside edge of said second door and having a second sealing lobe that defines a second cavity, said second sealing lobe disposed substantially entirely inwardly of a second centerline bisecting said second seal, said second seal having an elongate outer seal disposed near an outer surface of said second door;
said first door and said second door being movable between a closed position in which said first and second inside edges face one another to define said gap therebetween, said elongate outer seal extending across said gap when said first door and said second door are in said closed position,
said second sealing lobe sealingly abutting said first sealing lobe along said gap when said first door and said second door are in said closed position, said first and second sealing lobes mutually elastically deformable against one another when said first door and said second door are in said closed position, such that the interaction between said first and second sealing lobes creates a tortuous, arcuate contact profile having an inflection as viewed in cross-section,
said first sealing lobe deflects inwardly when said first and second doors are in said closed position such that a portion of said first sealing lobe is moved inwardly east an interior surface of said first door,
said second sealing lobe folds into a pocket when said first and second doors are in said closed position, said pocket defined between said first and second mounting portions and inwardly of said elongate outer seal, and
said second sealing lobe out of abutment with said first sealing lobe when said first door and said second door are in said open position.

17. The sealing assembly of claim 16, wherein:
said first seal comprises a monolithic seal and is connected to the entire periphery of said first door; and
said second seal comprises a monolithic seal and is connected to the entire periphery of said second door.

18. The sealing assembly of claim 16, wherein each of said first sealing lobe and said second sealing lobe has a rounded profile.

19. The sealing assembly of claim 16, wherein said first seal and second seal include first and second mounting portions, respectively, said first and second mounting portions each including a pair of walls spaced from one another to define a space therebetween, such that each said pair of walls are substantially parallel to one another when said first seal and said second seal are mounted to said first and second doors respectively.

20. The sealing assembly of claim 19, wherein said first and second mounting portions are formed monolithically with said first and second sealing lobes respectively.

21. The sealing assembly of claim 16, wherein said first and second sealing lobes each form a cavity in cross-section such that said first and second sealing lobes are hollow.

22. The sealing assembly of claim 21, wherein said first and second sealing lobes mutually elastically deform against one another when said first door and said second door are in said closed position, such that the interaction between said first and second sealing lobes creates a tortuous, arcuate contact profile therebetween.

23. The sealing assembly of claim 22, wherein said tortuous, arcuate contact profile between said first and second sealing lobes comprises a concave-to-convex inflection.

24. The sealing assembly of claim 21, wherein said cavity of each of said first and second sealing lobes comprises a generally triangular hollow.

25. The sealing assembly of claim 16, wherein the gap defined between the first inside edge of said first door and the second inside edge of said second door defines a range of gap widths, said second sealing lobe sealingly abutting said first sealing lobe at said gap when said first door and said second door are in said closed position for each respective gap width in the range of gap widths.

26. The sealing assembly of claim 16, wherein said inflection comprises a concave-to-convex inflection.

27. A method of sealing an opening with the sealing assembly of claim 16, the method comprising:
procuring the first seal, the first seal comprising:
a first plurality of seal portions;
a first plurality of seal corners, each of the seal corners integrally joining two of the first plurality of seal portions; and
the first plurality of seal portions joined by the seal corners to form a closed profile, the first plurality of seal portions cooperating to define at least one sealing lobe extending continuously around a periphery of the first seal;
attaching a first one of the first plurality of seal corners to a corresponding first corner of the first door;
stretching one of the first plurality of seal portions to align a second one of the first plurality of seal corners with a corresponding second corner of the first door;
attaching the second one of the first plurality of seal corners to the corresponding second corner of the first door; and
repeating said attaching and stretching steps for the remainder of the first plurality of seal corners such that the first seal fully encapsulates a periphery of the first door.

28. The method of claim 27, further comprising the additional step of:
- attaching each of the first plurality of seal portions to a corresponding edge of the first door, such that the corresponding edge occupies a space defined by the respective seal portion.

29. The method of claim 27, wherein said stretching step comprising stretching the respective seal portion by as little as 3% and as much as 30%.

30. The method of claim 27, further comprising the additional steps of:
- procuring the second seal, the second seal comprising:
  - a second plurality of seal portions;
  - a second plurality of seal corners, each of the seal corners integrally joining two of the second plurality of seal portions; and
  - the second plurality of seal portions joined by the seal corners to form a closed profile, the second plurality of seal portions cooperating to define at least one sealing lobe extending continuously around a periphery of the second seal;
- attaching a first one of the second plurality of seal corners to a corresponding first corner of the second door;
- stretching one of the second plurality of seal portions to align a second one of the second plurality of seal corners with a corresponding second corner of the second door;
- attaching the second one of the second plurality of seal corners to the corresponding second corner of the second door; and
- repeating said attaching and stretching steps for the remainder of the second plurality of seal corners such that the second seal fully encapsulates a periphery of the second door.

* * * * *

UNITED STATES PATENT AND TRADEMARK OFFICE
CERTIFICATE OF CORRECTION

| | | |
|---|---|---|
| PATENT NO. | : 8,839,564 B2 | Page 1 of 1 |
| APPLICATION NO. | : 13/193268 | |
| DATED | : September 23, 2014 | |
| INVENTOR(S) | : Andrew J. Happel et al. | |

It is certified that error appears in the above-identified patent and that said Letters Patent is hereby corrected as shown below:

In the Claims

Claim 16, Column 17, Line 62, delete "east" and insert --past--

Signed and Sealed this
Sixteenth Day of December, 2014

Michelle K. Lee
*Deputy Director of the United States Patent and Trademark Office*